United States Patent Office 3,231,438
Patented Jan. 25, 1966

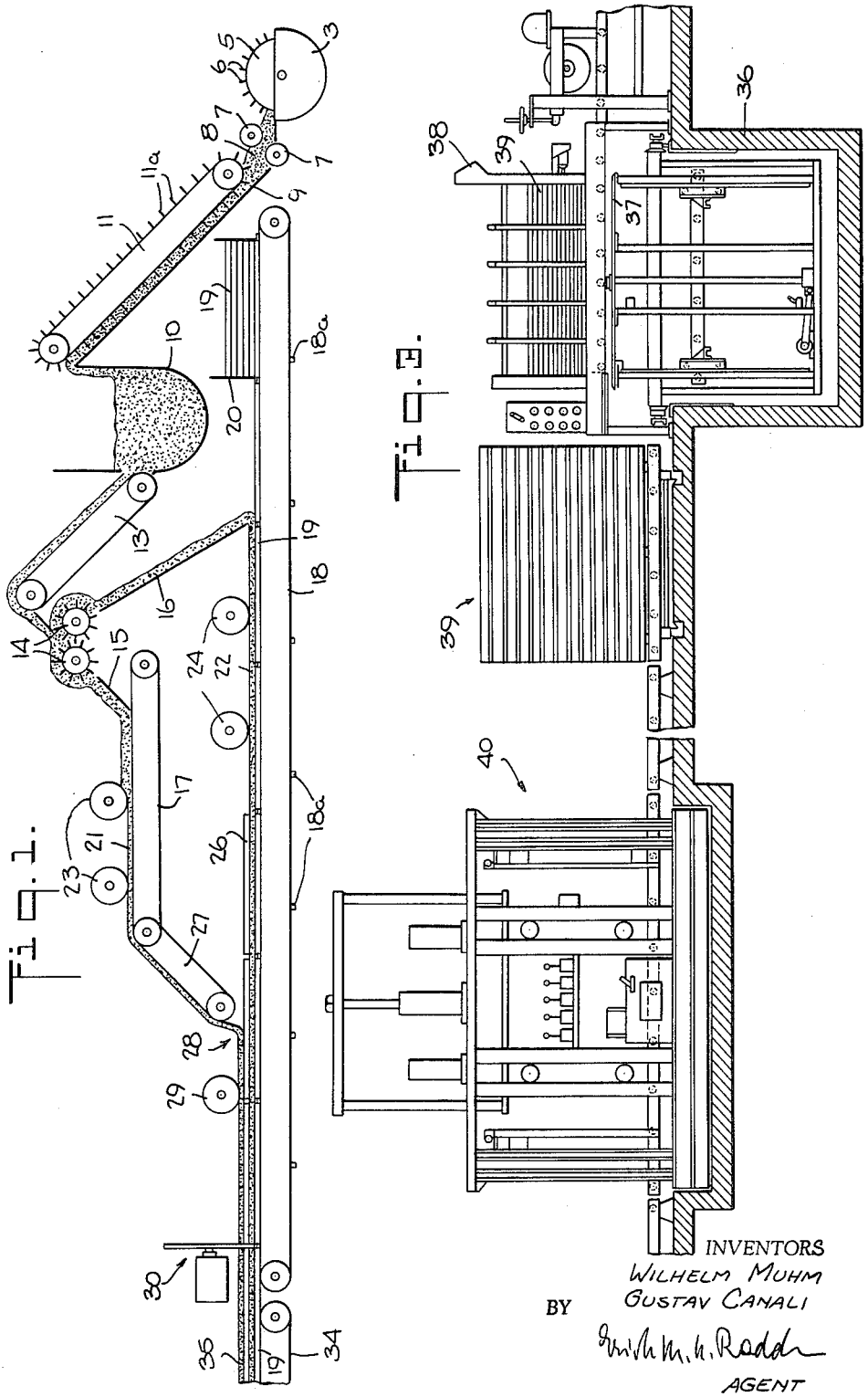

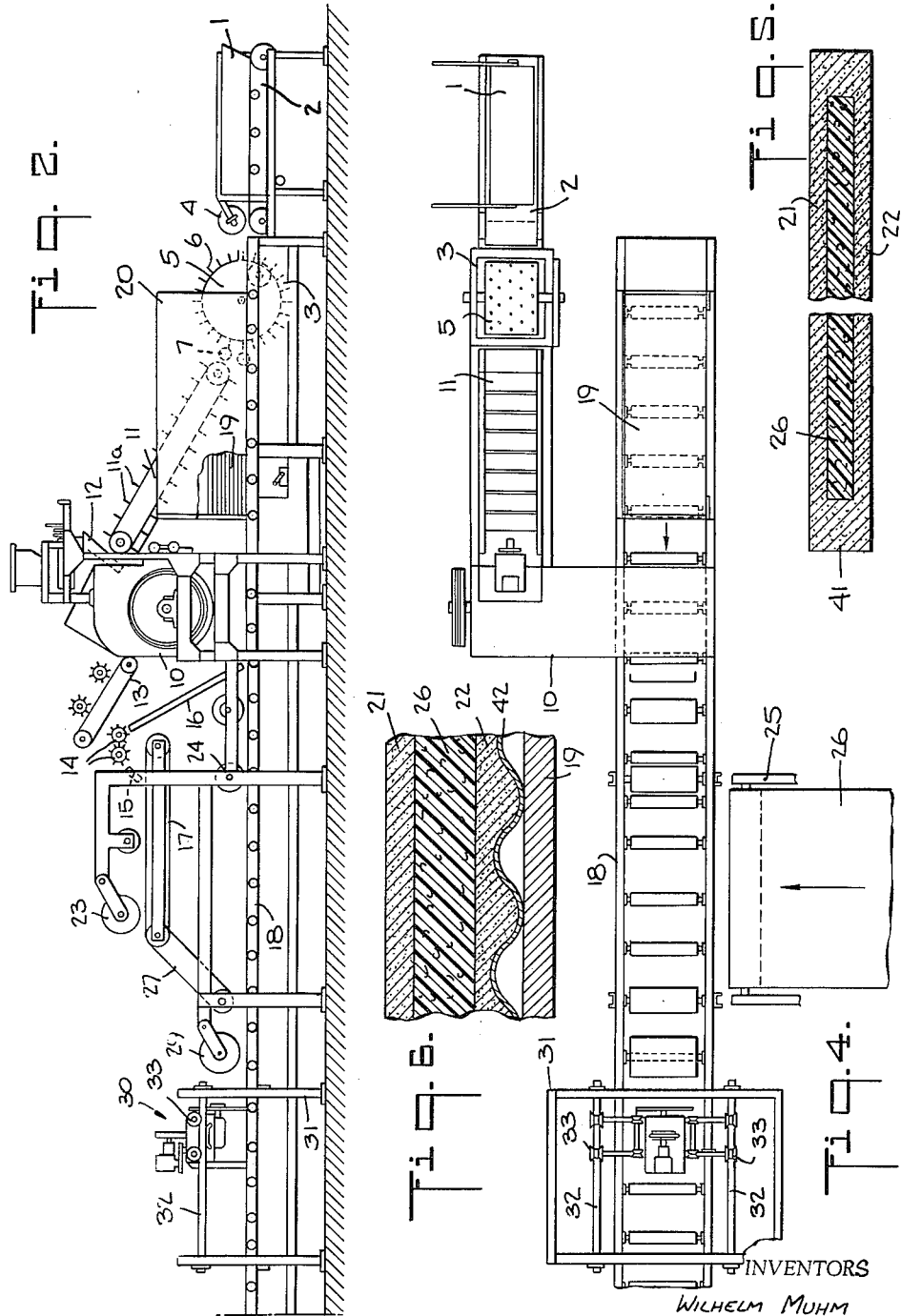

3,231,438
METHOD OF AND APPARATUS FOR PRODUCING LAMINATED ELEMENTS
Wilhelm Muhm, Wiesbaden, and Gustav Canali, Speyer, Germany, assignors to Etablissement Plastitect, Vaduz, Liechtenstein, a corporation of the Principality of Liechtenstein
Filed Apr. 3, 1963, Ser. No. 270,452
4 Claims. (Cl. 156—62.2)

The present invention relates to the manufacture of laminated structural elements consisting of a rigid plastic foam sheet and at least one covering layer mechanically interlocked with the plastic foam sheet by a multiplicity of microdowels extending from the covering layer or layers into the surface crevices of the plastic foam sheet.

Structural elements of this type are more fully disclosed and claimed in copending application Serial No. 270,424, filed by Wilhelm Muhm, one of the inventors of this application on April 3, 1963 and entitled "Laminated Structural Elements and Process of Making Same."

It is a primary object of this invention to produce such laminated structural elements continuously and economically.

This and other objects are accomplished in accordance with the invention by mineralizing a supply of wood wool by impregnating the wood fibers with an aqueous mineralizing liquor and supplying the moist wood fibers, wherefrom excess liquor has been removed, and a dry particulate binder to a mixing station where the fibers and the binder are thoroughly mixed to distribute the fibers randomly throughout the binder. The binder becomes adhesive in the presence of water and cement, gypsum, or magnesite are useful binders for this purpose.

The resultant mixture is continuously delivered from the mixing station to a laminating station and, on its way to the laminating station, the mixture is continuously spread into a layer and compacted. A succession of rigid plastic foam sheets is continuously delivered to the laminating station and the plastic foam sheets and the compacted layer are united at the laminating station, then the layer is cut to the size of the plastic foam sheets to form the structural elements, a plurality of the elements is stacked, pressure is applied to the stacked elements to compress the mixture layers thereof but without compressing the plastic foam sheets, and the binder is permitted to harden.

The mixture layer may be delivered to the laminating station along a first path and the plastic foam sheets along a second and different path below the first path whereby the layer is superposed over the plastic foam sheets at the laminating station.

According to one embodiment of this invention, a succession of horizontal supports is continuously delivered along the second path and the layer is superposed over the horizontal supports before being compacted, the layer is compacted on the horizontal supports and the succession of plastic foam sheets is continuously delivered on top of the compacted layer, each plastic foam sheet being of about the same size as, and in vertical alignment with, a respective one of the horizontal supports, the layer and superposed plastic foam sheets being delivered to the laminating station on their supports.

Since it is desirable to encase the plastic foam sheets in the finished elements completely within the covering layer material, the layers of the stacked elements may be laterally retained while pressed whereby layer material will be pressed over the edges of the plastic foam sheets and cover the edges.

In a preferred embodiment, the plastic foam sheet forms an intermediate layer of the elements and two covering layers face opposite surfaces of the intermediate plastic foam sheet. In this case, the mixture of wood fibers and binder is continuously delivered to a dividing station and there it is continuously divided into two portions. One portion is delivered along an upper path and the other portion along a lower path to the laminating station, the layer formed of the other portion being continuously supported on the succession of horizontal supports and the two covering layers with the plastic foam sheets sandwiched therebetween being continuously delivered to the laminating station on the supports.

The apparatus of the invention comprises a mixer, upper conveyor means continuously delivering the wood fiber-binder mixture from the mixer to a pressure roll and means associated with the upper conveyor means for continuously spreading the mixture into a layer. A lower conveyor means continuously delivers a succession of rigid plastic foam sheets to the pressure roll and means is associated with the conveyor means for compacting the layer. The conveyor means is arranged to deliver the compacted layer and the succession of plastic foam sheets to the pressure roll and the roll is associated with the layer conveyor means for uniting the plastic foam sheets and the compacted layer. Furthermore, means is associated with the lower conveyor means for cutting the layer to the size of the plastic foam sheets, the cutting means moving synchronously with the lower conveyor means for cutting the layer while it moves on the lower conveyor means from the pressure roll.

In a preferred embodiment of the apparatus, a first conveyor means continuously delivers the mixture to a means dividing the mixture into two portions and means is associated with the upper conveyor means for continuously spreading the one mixture portion into a layer and for compacting the layer. A magazine holding a stack of the horizontal supports is mounted at one end of the lower conveyor means and the lower conveyor means constitutes the bottom of the magazine. A plurality of spaced dogs are mounted on the lower conveyor means for engaging and entraining a lowermost of the horizontal supports in the magazine, the spacing of the dogs being approximately the same as the length of the horizontal supports whereby a succession of adjacent ones of the supports are placed on the lower conveyor means. A fourth conveyor means continuously delivers the other mixture portion from the dividing means to the lower conveyor means and deposits this portion on the succession of supports, means being associated with the fourth conveyor means for continuously spreading the other mixture portion into a layer. Means is associated with the lower conveyor means for compacting the layer on the horizontal supports and a supply of the plastic foam sheets is associated with the lower conveyor means between the compacting means and the pressure roll whereby a succession of the plastic foam sheets may be placed on the compacted layer on the lower conveyor means. The upper conveyor means is arranged to deliver the one mixture portion layer onto the succession of plastic foam sheets moving on the lower conveyor means towards the pressure roll and thence the sheets and layers are united, cut, pressed, and dried.

In a preferred embodiment, the dividing means consists of a pair of counter-rotating pronged rolls arranged respectively between the first conveyor means and the upper and fourth conveyor means, the prongs of the rolls constituting the layer spreading means. One of the rolls continuously delivers the one mixture portion to the upper conveyor means and the other roll continuously delivers the other mixture portion to the fourth conveyor means.

The above and other objects, advantages and features of the present invention will be more fully described in connection with the following detailed description of a preferred apparatus, taken in conjunction with the accompanying drawing wherein FIG. 1 is a schematic side view of a portion of the laminating apparatus;

FIG. 2 is a more detailed side view of a portion of the apparatus shown schematically in FIG. 1;

FIG. 3 is a detailed side view of a portion of the apparatus following the portion shown in FIGS. 1 and 2;

FIG. 4 is a top view showing parts of the apparatus portion shown in FIGS. 1 and 2;

FIG. 5 is a vertical cross-section showing a typical structural element produced on the apparatus; and FIG. 6 is a partial vertical cross-section of a structural element supported on a corrugated horizontal support.

Referring now to the drawing, wherein like reference numerals in all figures designate like parts, and first to FIGS. 1, 2, and 4, a supply of wood wool is delivered and metered into a container 1 whose bottom is formed by an endless conveyor band 2 which feeds the wood wool into a mixing tank 3. The wood wool is preferably made of wood fibers having a length of about 35–50 cm., a width of about 1.5–5 mm., preferably 2.5–3.5 mm., and a thickness of about 0.25–0.40 mm., preferably about 0.35 mm. To spread the wood wool into a layer, it is fed at the end of conveyor 2 under a roll 4 which may be pivotally mounted on the container 1 to make the nip adjustable.

The mixing tank 3 is semi-cylindrical and a cylindrical mixing drum 5 is mounted for rotation in the tank to provide a semi-annular mineralizing chamber in the tank, through which the wood fibers are pushed by a multiplicity of fingers 6 extending from the surfaces of the rotating mixing drum. The tank is filled with an alkaline liquor consisting of three parts by weight of calcium chloride and one part by weight of magnesium chloride of about 3° to 4° Bé. In this manner, the wood fibers are thoroughly impregnated with the liquor during their passage through the mineralizing station. As the mineralized fibers leave the chamber, they pass through the nip of two adjustably mounted squeeze rolls 7, 7 to remove excess liquor from the wood fibers. The rotating squeeze rolls deliver the moist wood wool 8 to an upwardly inclined support 9 leading to the mouth of mixer 10. An endless conveyor 11 including a plurality of transversely extending scrapers 11a carries the moist wood wool upwardly on the inclined support and deposits the same through the mouth of the mixer into the mixer 10.

At this mixing station, a dry, particulate binder is fed into the mixer 10 through funnel 12 and the binder is thoroughly mixed with the wood fibers. Useful binders which will become adhesive in the presence of water include cement, plaster of Paris, or gypsum, or magnesite, for instance, and such binders are advantageously mixed with the wood wool in a proportion of about 1.5–3.0 parts by weight of the binder to one part by weight of the wood wool. To assure thorough distribution of the binder throughout the mass of wood fibers and to attain other desirable properties in the end products, plasticizers and/or surface-active agents may also be metered into the mixer 10.

All the components are thoroughly stirred at the mixing station to provide a random distribution of the wood fibers in the binder. As shown in FIG. 4, the mixer 10 is elongated and it may be slightly inclined from its inlet or mouth at feed conveyor 11 downwardly toward its laterally spaced outlet facing delivery conveyor 13. The stirring mechanism in the mixer includes suitably configurated, i.e. spiral, baffles entraining the mixture from the mouth to the outlet whence it is transported on the endless delivery band 13. A series of rotating drums having a multiplicity of fingers or prongs are mounted above the delivery band 13 and spread the mixture evenly over the conveyor band to produce a layer of the desired thickness.

A pair of counter-rotating pronged rolls 14, 14 are arranged at the end of delivery conveyor 13 and receive the mixture layer therefrom and to deliver it in two layers to chutes 15, 16 associated with a respective one of these rolls. Chute 15 deposits the mixture on an upper endless conveyor band 17 and chute 16 leading to a lower endless roller conveyor 18 running parallel to the upper conveyor.

The roller conveyor carries a plurality of suitably spaced dogs 18a and one end of this conveyor extends into a supply magazine 20 holding a stack of superposed horizontal supports 19. These supports may be of any suitable rigid material, for instance, plywood plates, and as the roller conveyor passes through the magazine and underneath the stack of supports, the conveyor dogs will entrain the lowermost of the supports and carry it along on the moving conveyor, the superposed supports dropping each time the lowermost support is removed from the stack and the roller conveyor being thus always covered by a support as long as the magazine 20 remains filled with supports. In this manner, the chute 16 will deposit the wood wool-binder mixture on a respective one of the supports 19 carried along by the endless roller conveyor 18.

In the layer-spreading station constituted by the parallel upper and lower conveyors 17 and 18, the wood wool-binder mixture is compacted into solid layers 21 and 22, respectively, by a series of pressure rollers 23 and 24 mounted above the respective conveyors and exerting a suitable pressure on the mixture moving therealong.

After the lower layer 22 has been compacted, it passes through a station 25 laterally adjacent the roller conveyor 18 and holding a supply of plastic foam sheets 26 of substantially the same size as the horizontal supports 19 and, as each support with its layer 22 thereon passes by this station, a plastic foam sheet is placed on layer 22 in alignment with the respective support.

Meanwhile, the upper compacted layer 21 is transported downwardly by inclined endless conveyor band 27 adjoining the conveyor band 17 and driven at the same speed. The plastic foam layer inserting station preceding the delivery point of conveyor 27, the compacted upper layer 21 is thus deposited on top of the plastic foam sheets 26, the three layers being superposed and laminated at point 28.

After the laminating station 28, the superposed layers pass under pressure roll 29 applying a suitable pressure on the laminated structure to compress it preliminarily into a unitary element. This is carried by the conveyor 18 through a cutting station 30.

In the cutting station, a stand 31 carries rails 32 running parallel to the conveyor and holding rollers 33, 33 supporting a knife carriage for synchronous movement with the conveyor. The speed of the knife carriage is accurately synchronized with the conveyor speed and a reciprocating knife cuts the wood fiber-binder layers 21, 22 along the edges of the co-extensive supports 19 and plastic foam sheets 26 so that separated laminated elements of the dimensions of the supports leave the cutting station.

From the cutting station, the individual laminated elements 35 on their supports 19 are moved on an endless conveyor 34 to a stacking station 36 (see FIG. 3). The stacking station holds a hydraulically movable platform 37 receiving the elements 35, as they come from conveyor 34, and these elements with their supports are placed on the platform, the platform being lowered stepwise by the combined thickness of the support and laminated element so that a stack thereof may be prepared on the platform. Preferably, a magazine 38 holding a supply of wooden ledges 39 is mounted above the stacking station and these ledges are delivered to the stacked elements 35 so as to surround the same along all edges. The ledges are temporarily fastened to the edges of the elements in any suitable manner.

After a stack of, say 15, elements 35 on their supports 19 has been completed, the hydraulic platform 37 is raised and the stack 39 is moved into a hydraulic press 40 where it is subjected to a suitable pressure designed to press the layers 21 and 22 of each laminated element to the desired density and thickness. Suitable pressures have been found to be in the range of about 0.5–1.2 kg./sq. cm., preferably about 0.8–1.0 kg./sq. cm., pressures above about 1.5 kg./sq. cm. being excluded because they would damage the intermediate plastic foam layers of the elements. If the ledges 39 are slightly spaced from the edges of the elements during compression in the pressing station 40, some of the wood wool-binder mixture will be pressed around the edges of the plastic foam sheet so as to form a rim 41 (see FIG. 5) all around the finished element, leaving none of the plastic foam exposed to the outside and having it fully encased in the pressed wood fiber-binder material.

The stack of pressed elements 35 is held under compression by suitable clamping means until the binder has hardened, which normally takes about 24 hours if drying takes place in the ambient atmosphere. If the stack is dried under heat, the setting time may be considerably shortened.

After the elements have been dried, they may be trimmed and removed from their supports, these supports being returned to magazine 20 for re-use. A finished structural element produced in the described manner is shown in FIG. 5.

If it is desired to have the outer surface of one of the covering layers corrugated, a corrugated sheet 42 may be placed over each support 19 (see FIG. 6).

Also, if a two-layer laminate is desired, one of the rolls 14 may simply be kept out of operation so that only one layer of the wood fiber-binder mixture is delivered to lower conveyor 18 and to the laminating station 28. If only the roll 14 in association with chute 16 is operated, the lower layer 22 will be laminated with the superposed plastic foam layer 26 and there will be no covering layer on the upper surface of the plastic foam sheet. If the other roll 14 in association with chute 15 is operated, the plastic foam sheet 26 placed on conveyor 18 ahead of the laminating station will serve as the horizontal support for the superposed wood wool-binder layer 21 and there is, therefore, no need for a support supply. In all other ways, the production of a two-layer structural element on the described and illustrated machine is the same as that of a three-layer laminate.

Two-layer structural elements may be particularly useful as lost concrete forms since, unexpectedly, the concrete will seep into the crevices of the adjacent plastic foam layer and thus produce micro-dowels on hardening in the form although usually aqueous binders, such as concrete, will not unite with hydrophobic materials, such as plastic. On the other hand, the outer surface of the form will consist of the wood fiber-cement or plaster mixture which needs no further finishing or treatment before being painted.

While the invention has been described in connection with a preferred machine, it will be clearly understood that many variations and modifications may occur to the skilled in the art without departing from the spirit and scope of this invention as defined in the appended claims.

We claim:
1. An apparatus for producing a laminated element consisting of an intermediate plastic foam sheet and two covering layers facing opposite surfaces of the intermediate sheet, comprising a mixer for thoroughly mixing wood fibers and a dry particulate binder, a first conveyor means continuously delivering the resultant mixture to a means for dividing the mixture into two portions, a pressure roll, upper conveyor means continuously delivering one mixture portion from the dividing means to the pressure roll, means associated with the upper conveyor means for continuously spreading the one mixture portion into a layer and for compacting the layer, a lower conveyor means, a magazine holding a stack of horizontal supports, one end of the lower conveyor means constituting the bottom of the magazine, a plurality of spaced dogs on the lower conveyor means for engaging and entraining a lowermost of the horizontal supports in the magazine, the spacing of the dogs being approximately the same as the length of the horizontal supports whereby a succession of adjacent ones of said supports are placed on the lower conveyor means, and fourth conveyor means continuously delivering the other mixture portion from the dividing means to the lower conveyor means, means associated with the fourth conveyor means for continuously spreading the other mixture portion into a layer, the fourth conveyor means being arranged to deposit the other mixture portion layer onto the succession of horizontal supports on the lower conveyor means, means associated with the lower conveyor means for compacting the layer on the horizontal supports, a supply of rigid plastic foam sheets of about the same size as said horizontal supports and associated with the lower conveyor means between the compacting means and the pressure roll whereby a succession of said plastic foam sheets may be placed on the compacted layer on the lower conveyor means, the upper conveyor means being arranged to deliver the one mixture portion layer onto the succession of plastic foam sheets moving on the lower conveyor means toward said pressure roll, said roll being associated with the lower conveyor means for uniting the plastic foam sheets and the compacted covering layers, means associated with the lower conveyor means for cutting the layer to the size of the plastic foam sheets to form said elements, means for moving the cutting means synchronously with the lower conveyor means for cutting the layer while it moves on the lower conveyor means from the pressure roll, means for stacking a plurality of said elements, and a press for applying sufficient pressure to the stacked elements to compress the mixture layers thereof but without compressing the plastic foam sheets.

2. The apparatus of claim 1, wherein said dividing means consists of a pair of counter-rotating pronged rolls arranged respectively between the first conveyor means and said upper and fourth conveyor means, the prongs on the rolls constituting said spreading means, one of the rolls continuously delivering the one mixture portion to the upper conveyor means and the other roll continuously delivering the other mixture portion to the fourth conveyor means.

3. A method of producing a laminated element consisting of a rigid plastic foam sheet and at least one covering layer, comprising the steps of supplying moist wood fibers and a dry particulate binder becoming adhesive in the presence of water to a mixing station, thoroughly mixing the fibers and the binder to distribute the fibers randomly throughout the binder, continuously delivering the resultant mixture from the mixing station to a laminating station, continuously spreading the mixture into a layer and continuously delivering the layer along a first path onto a succession of horizontal supports, continuously delivering the succession of horizontal supports in a second and different path below the first path whereby the layer is superposed over the horizontal supports before being compacted, compacting the layer on the horizontal supports, continuously delivering a succession of rigid plastic foam sheets on top of the compacted layer, each plastic foam sheet being of about the same size as, and in vertical alignment with, a respective one of the horizontal supports, delivering the layer and the superposed plastic foam sheets on the supports to the laminating station, uniting the plastic foam sheets and said layer at the laminating station, cutting the layer to the size of the plastic foam sheets to form said elements, stacking a plurality of said elements, applying pressure to the stacked elements to compress the mixture layers thereof but without compressing the plastic foam sheets, and permitting the binder to harden.

4. The method of claim 3, further comprising the step of laterally retaining the layers of the stacked elements while applying the pressure thereto whereby layer material will be pressed over the edges of the plastic foam sheets and cover the edges.

References Cited by the Examiner

UNITED STATES PATENTS

| | | | |
|---|---|---|---|
| 1,772,648 | 8/1930 | Upson | 156—79 X |
| 1,808,571 | 6/1931 | Raynes | 156—42 |
| 1,999,509 | 4/1935 | Merritt | 156—283 |
| 2,088,813 | 8/1937 | Roos | 156—79 X |
| 2,276,083 | 3/1942 | Moeller | 156—222 X |
| 2,281,591 | 5/1942 | Moore | 156—42 X |
| 2,624,079 | 1/1953 | Duvall | 19—155 |
| 2,759,517 | 8/1956 | Marco. | |
| 2,972,559 | 2/1961 | Allen et al. | 156—79 |
| 3,057,022 | 10/1962 | Bar et al. | 19—155 |

FOREIGN PATENTS 881,165    11/1961    Great Britain.

EARL M. BERGERT, *Primary Examiner.*